United States Patent
Ishikawa

(10) Patent No.: US 8,355,329 B2
(45) Date of Patent: Jan. 15, 2013

(54) PACKET RELAY DEVICE

(75) Inventor: Yuichi Ishikawa, Machida (JP)

(73) Assignee: Alaxala Networks Corporation, Kawasaki (JP)

( * ) Notice: Subject to any disclaimer, the term of this patent is extended or adjusted under 35 U.S.C. 154(b) by 384 days.

(21) Appl. No.: 12/572,635

(22) Filed: Oct. 2, 2009

(65) Prior Publication Data

US 2010/0091770 A1 Apr. 15, 2010

(30) Foreign Application Priority Data

Oct. 6, 2008 (JP) .................................. 2008-259387

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ..................... 370/235.1; 370/235; 370/236; 370/253; 370/412; 370/413

(58) Field of Classification Search .................. None
See application file for complete search history.

(56) References Cited

U.S. PATENT DOCUMENTS

| | | | |
|---|---|---|---|
| 7,477,621 B1 * | 1/2009 | Loc et al. ........................ | 370/329 |
| 2002/0167957 A1 * | 11/2002 | Brandt et al. .................. | 370/412 |
| 2006/0187836 A1 * | 8/2006 | Frey et al. ....................... | 370/235 |
| 2007/0201461 A1 | 8/2007 | Shinohara et al. | |
| 2009/0267661 A1 * | 10/2009 | Ootsuki et al. ................ | 327/156 |

FOREIGN PATENT DOCUMENTS

| | | | |
|---|---|---|---|
| JP | 7-28550 | | 1/1995 |
| JP | 07028550 | * | 1/1995 |
| JP | 2006-222821 | | 8/2006 |
| JP | 2007-228491 A | | 9/2007 |
| WO | PCT/JP2006/322312 | * | 5/2007 |

OTHER PUBLICATIONS

Notification of Reasons for Rejection mailed Oct. 18, 2011 in Japan Application No. 2008-259387.

* cited by examiner

*Primary Examiner* — Jae Y Lee
(74) *Attorney, Agent, or Firm* — Foley & Lardner LLP

(57) ABSTRACT

The packet relay device includes a clock generation portion adapted to generate a clock signal of prescribed frequency as a standard for operation of the packet relay device; a timer portion adapted to count up a timer value over a first number of clock cycles on the basis of the clock signal; a relay control portion adapted relay received packets while limiting to a prescribed amount of packets the amount of packets forwardable per a predetermined increment of the timer value; and a power control portion adapted to reduce the frequency of the clock signal to 1/n in order to reduce power consumption by the packet relay device. If the frequency of the clock signal has been reduced to 1/n by the power control portion, the timer portion counts up the timer value over a number of clock cycles equivalent to 1/n the aforementioned number of clock cycles.

7 Claims, 13 Drawing Sheets

Fig.4
| ENTRY NO. | LIMIT RATE | LAST RECEPTION TIMER VALUE | BURST PACKET AMOUNT | ALLOWABLE PACKET AMOUNT |
|---|---|---|---|---|
| 1 | R | TLST | CNT | THR |
| 2 | R | TLST | CNT | THR |
| 3 | R | TLST | CNT | THR |
| 4 | R | TLST | CNT | THR |
| ⋮ | ⋮ | ⋮ | ⋮ | ⋮ |
TBL
Fig.5
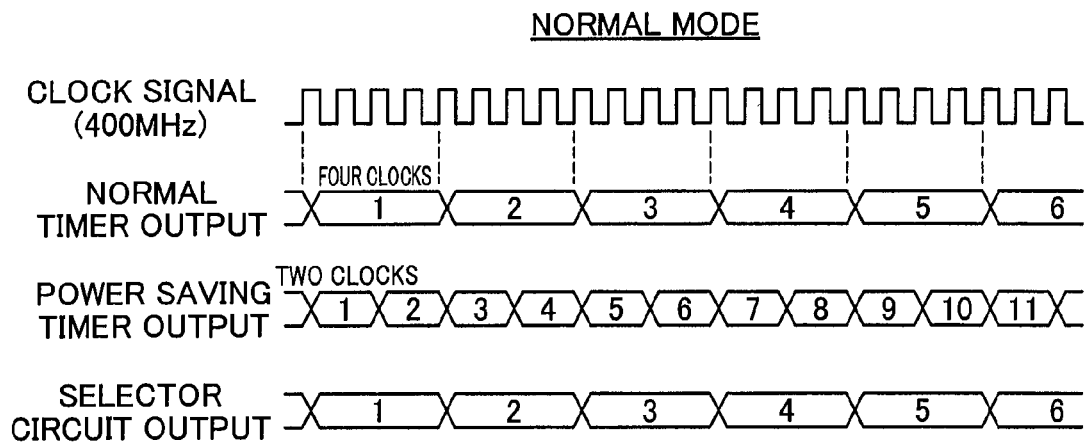
Fig.6
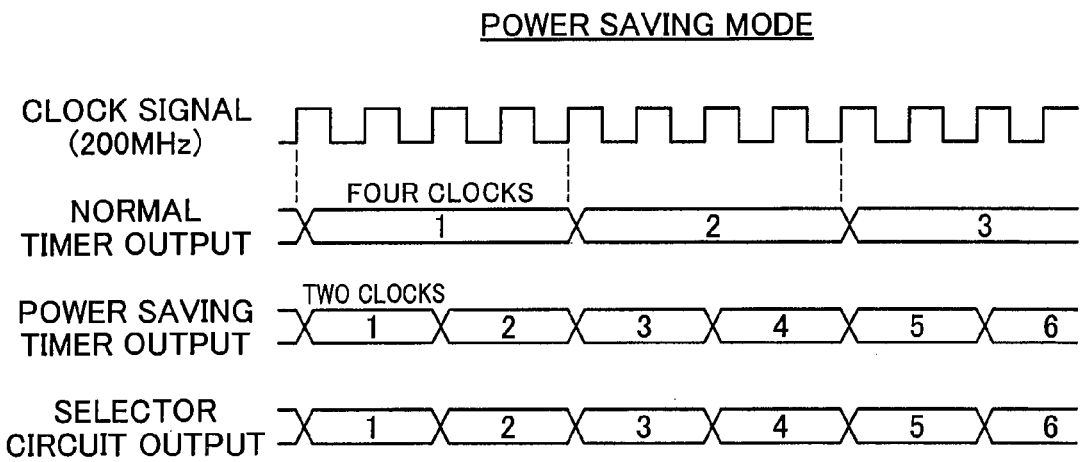

| QUEUE NO. | LIMIT RATE | LAST RECEPTION TIMER VALUE | DELAY TIMER VALUE |
|---|---|---|---|
| 1 | Rb | TLSTb | DT |
| 2 | Rb | TLSTb | DT |
| 3 | Rb | TLSTb | DT |
| 4 | Rb | TLSTb | DT |
| ⋮ | ⋮ | ⋮ | ⋮ |

TBLb

Fig.16

| ENTRY NO. | LIMIT RATE | LAST RECEPTION TIMER VALUE | BURST PACKET AMOUNT | ALLOWABLE PACKET AMOUNT | TIMER SELECT FLAG |
|---|---|---|---|---|---|
| 1 | R | TLST | CNT | THR | 0 |
| 2 | R | TLST | CNT | THR | 1 |
| 3 | R | TLST | CNT | THR | 1 |
| 4 | R | TLST | CNT | THR | 1 |
| ⋮ | ⋮ | ⋮ | ⋮ | ⋮ | ⋮ |

TBL

Fig.17

| QUEUE NO. | LIMIT RATE | LAST RECEPTION TIMER VALUE | DELAY TIMER VALUE | TIMER SELECT FLAG |
|---|---|---|---|---|
| 1 | Rb | TLSTb | DT | 0 |
| 2 | Rb | TLSTb | DT | 1 |
| 3 | Rb | TLSTb | DT | 1 |
| 4 | Rb | TLSTb | DT | 1 |
| ⋮ | ⋮ | ⋮ | ⋮ | ⋮ |

TBLb

PACKET RELAY DEVICE

CROSS-REFERENCE TO RELATED APPLICATION

The present application claims the priority based on Japanese Patent Application No. 2008-259387 filed on Oct. 6, 2008, the disclosure of which is hereby incorporated by reference in its entirety.

BACKGROUND

1. Technical Field

The present invention relates to technology for reducing power consumption by a packet relay device that is used for relaying packets.

2. Related Art

Packet relay devices such as switches and routers are very important devices in terms of building networks. Increasing scale of networks and increasing volumes of packets being transported seen in recent years have been accompanied by remarkable improvements in processing capabilities or packet relay capabilities of packet relay devices.

Accelerating the operating clock speed is crucial to boosting the processing capabilities of a packet relay device, but the higher operating clock speeds of recent years are associated with higher power consumption by packet relay devices. In this regard, JP-A-2007-228491 discloses technology intended to reduce power consumption by a packet relay device by slowing the operating clock with reference to current conditions of utilization of the packet relay device.

However, simply slowing operating clock of a packet relay device for the purpose of reducing power consumption poses a risk that the amount at which the packet relay device is able to forward packets per unit time will drop.

SUMMARY

An object of the invention is to provide technology whereby the amount at which a packet relay device is able to forward packets can be kept constant, even if the operating clock of the packet relay device has been slowed.

According to an aspect of the invention, there is provided a packet relay device for relaying packets flow through a network. The packet relay device includes a receiving portion that receives packets; a clock generation portion that generates a clock signal of prescribed frequency as a standard for operation of the packet relay device; a timer portion that counts up a timer value over a first number of clock cycles based on the clock signal; a relay control portion that receives the timer value from the timer portion, and relays the received packets to a destination specified by header information of the packets while limiting the amount of packets forwardable per a predetermined increment of the timer value to a prescribed amount of packets. a power control portion that controls the clock generation portion to reduce the frequency of the clock signal to 1/N, so as to reduce power consumption by the packet relay device, where N is a real number greater than 1; wherein after the frequency of the clock signal has been reduced to 1/N by the power control portion, the timer portion counts up the timer value over a second number of clock cycles equivalent to 1/N the first number of clock cycles.

With the packet relay device configured in this way, in the event that operating clock frequency has been reduced to 1/N for the purpose of reducing power consumption, the number of clock cycles in which the timer counts up will also go to 1/N. Therefore, the cycle of timer values output by the timer portion will remain unchanged before and after a drop in clock frequency. As a result, it will be possible for the amount at which the packet relay device is able to forward packets per a predetermined increment of the timer value to be maintained at a constant level, irrespective of switching of the operating clock.

The limiting the amount of the packets may be performed by determining that the received packets cause bandwidth violation, when the amount of the received packets per the predetermined increment of the timer value has exceeded the prescribed amount of packets.

With such the packet relay device, the relayed packet amount can be limited, for example, by discarding packets that are determined to cause bandwidth violation. Additionally, through marking by overwriting the packet header (e.g. the TOS field of the IPv4 header) of packets determined to cause bandwidth violation, the relayed packet amount can be limited without having to perform marking. Further, for packets determined to cause bandwidth violation, by reducing the threshold value of the queue for storing these in the packet relay device, the relayed packet amount can be limited without having to change the threshold value of the queue.

The relay control portion may detect flows of the received packets based on the header information, and may perform the limiting the amount of the packets separately for each of the flows.

With this packet relay device, the relayed packet amount can be limited for individual flows of packets.

The timer portion may be capable of outputting both a first timer value that is counted up over the first number of clock cycles and a second timer value that is counted up over the second number of clock cycles, even if the frequency of the clock signal has been reduced to 1/N by the power control portion; and separately for each of the flows, the relay process portion may select, based on a prescribed setting, whether to use the first timer value or the second timer value.

With this packet relay device, for individual flows of packets, it will be possible to select whether or not to maintain at a constant level the amount at which packets can be forwarded per the predetermined increment of the timer value.

The relay control portion may perform the limiting the amount of the packets by delaying transmission timings of the received packets, depending on packet length of the received packets and the amount of packets forwardable per the predetermined increment of the timer value.

With this packet relay device, the relayed packet amount can be limited by delaying the transmission time of received packets.

The relay control portion may queue the received packets separately for the each destination, and performs the limiting the amount of the packets separately for the each destination.

With this packet relay device, the relayed packet amount can be limited based on individual forwarding destinations for packets.

The timer portion may be capable of outputting both a first timer value that is counted up over the first number of clock cycles and a second timer value that is counted up over the second number of clock cycles, even if the frequency of the clock signal has been reduced to 1/N by the power control portion; and separately for the each destination, the relay process portion may select, based on a prescribed setting, whether to use the first timer value or the second timer value.

With this packet relay device, for the each destination, it will be possible to select whether or not to maintain at a constant level the amount at which packets can be forwarded per the predetermined increment of the timer value.

The timer portion may include: a normal timer portion that counts up a first timer value over the first number of clock cycles; a power saving timer portion that counts up a second timer value over the second number of clock cycles; and a selector circuit that switches the timer value that is output by the relay control portion to either the first timer value counted up by the normal timer portion or the timer value counted up by the power saving timer portion, based on an instruction from the power control portion.

With this packet relay device, the timer portion capable of outputting two different timer values can be produced through a simple circuit design.

Besides being embodied as the packet relay device described above, the present invention can additionally be embodied as a method of controlling a packet relay device, or as a computer program. The computer program may be recorded on a computer-readable recording medium. Examples of recording media that can be utilized for this purpose include various recording media such as flexible disks, CD-ROM, DVD-ROM, magnetooptical disks, memory cards, and hard disks.

These and other objects, features, aspects, and advantages of the invention will become more apparent from the following detailed description of the preferred embodiments with the accompanying drawings.

BRIEF DESCRIPTION OF THE DRAWINGS

FIG. 4 is a diagram depicting the arrangement of a bandwidth policing table;

FIG. 5 is a timing chart depicting timer value states output from a timer circuit in normal mode;

FIG. 6 is a timing chart depicting timer value states output from a timer circuit in power saving mode;

FIG. 16 is an illustration depicting a modification of the bandwidth policing table;

FIG. 17 is an illustration depicting a modification of the queue table; and

DESCRIPTION OF THE PREFERRED EMBODIMENTS

The embodiments of the invention will be described in the order indicated below.

A. Embodiment 1
(A1) General Configuration of Packet Relay Device of Embodiment 1
(A2) Detailed Configuration of Bandwidth Policing Portion
(A3) Bandwidth Policing Process
B. Embodiment 2
(B1) General Configuration of Packet Relay Device of Embodiment 2
(B2) Detailed Configuration of Packet Transmission Circuit
(B3) Bandwidth Shaping Process
C. Modified Embodiments A. Embodiment 1

(A1) General Configuration of Packet Relay Device of Embodiment 1

Figure 1:
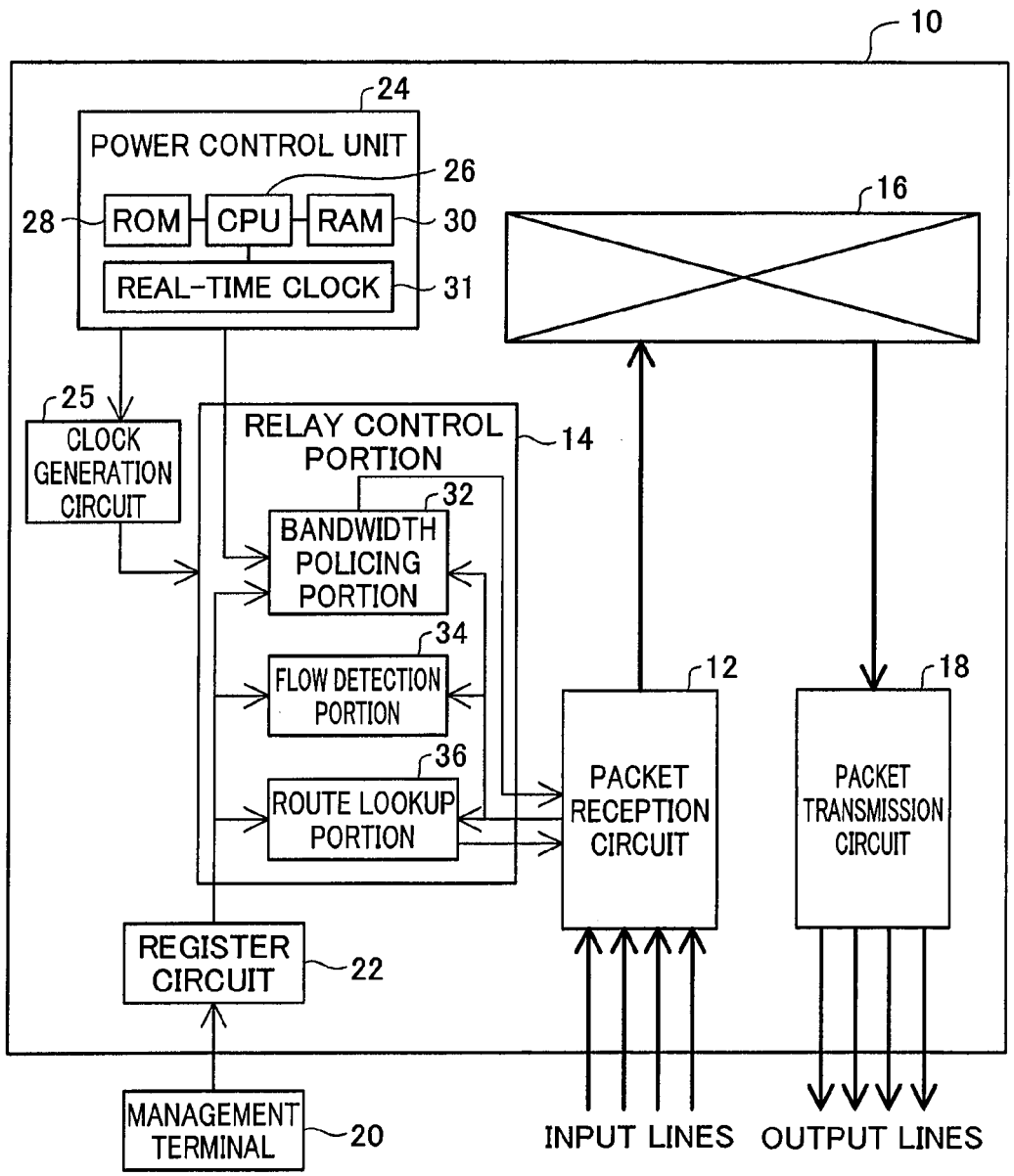
FIG. 1 is an illustration depicting the general configuration of a packet relay device according to Embodiment 1.

FIG. 1 depicts the general configuration of a packet relay device 10 according to Embodiment 1. The packet relay device 10 is a device that connects different networks together, and that relays packets being transferred between these networks.

As depicted in FIG. 1, the packet relay device 10 includes a packet reception circuit 12 adapted to receive packets from other communications devices; a relay control portion 14 adapted to carry out a process to parse header information of packets received by the packet reception circuit 12 and ascertain the relay destination (hereinafter termed the relay process); a packet relay circuit 16 adapted to switch the output destination for packets on the basis of an instruction from the relay control portion 14; and a packet transmission circuit 18 adapted to transmit packets that have been transferred from the packet reception circuit 12 to other communications devices via the packet relay circuit 16. The packet reception circuit 12 is provided with a plurality of input circuits, and the packet transmission circuit 18 is provided with a plurality of output circuits. A plurality of packet reception circuits 12 and of packet transmission circuits 18, respectively, may be provided as well.

The packet relay device 10 further includes a register circuit 22 adapted to receive and save various settings made from a management terminal 20 such as a personal computer; a power control unit 24 adapted to control the power mode of the packet relay device 10; and a clock generation circuit 25 adapted to generate a clock signal serving as reference for operations of the packet relay device 10.

The power control unit 24 includes a CPU 26, ROM 28, RAM 30, and a real time clock 31. The real-time clock 31 is provided as a completely separate circuit from the clock generation circuit 25 mentioned above. By loading a power control program saved in the ROM 28 into the RAM 30 and executing it, the CPU 26 performs control to regulate power consumption by the packet relay device 10. In the present embodiment, on the basis of time information obtained from the real-time clock 31, the power control unit 24 will determine whether the current time of day is nighttime (e.g. 23:00 to 5:00). If it is currently nighttime, it will bring the power mode to power saving mode; or if it is not currently nighttime, it will bring the power mode to normal mode.

In the event that the power control unit 24 has brought the power mode to power saving mode, an instruction will be presented to the clock generation circuit 25, and the clock signal generated by this clock generation circuit 25 will be reduced to a frequency of lower than that in normal mode. In the present embodiment, power saving by the packet relay device 10 is carried out in this way by lowering the frequency of the clock signal that serves as reference for operations of the packet relay device 10. In the present embodiment, the power mode is switched according to the current time of day; however, it would also be acceptable to switch the power mode on the basis of the packet amount received by the packet reception circuit 12 within a given time interval. Specifically, if the packet amount received within a given time interval is lower than a prescribed threshold value, the system will assume power saving mode; or if greater, the system will assume normal mode. It is also possible for the power control unit 24 to learn time slots that are associated with increasing or decreasing numbers of received packets, and to control the power mode to power saving mode during time slots in which lower received packet amounts are observed.

The clock generation circuit 25 is composed of a crystal oscillator or PLL circuit, and presents the generated clock signal to the relay control portion 14. The clock generation circuit 25 receives from the power control unit 24 a control signal indicating a power mode, and generates an appropriate clock signal depending on the power mode in question. In the present embodiment, if the control signal received from the power control unit 24 indicates the normal mode, the frequency of the output clock signal will be set to 400 MHz. On the other hand, if the control signal received from the power control unit 24 indicates the power saving mode, the frequency of the output clock signal will be set to 200 MHz. That is, according to the present embodiment, in power saving mode the packet relay device 10 will operate at a clock frequency lower by half than that during normal mode.

The relay control portion 14 is composed of an ASIC (Application Specific Integrated Circuit) or an FPGA (Field Programmable Gate Array) that operates in sync with the clock signal input from the clock generation circuit 25. The relay control portion 14 is provided by way of internal circuitry with a bandwidth policing portion 32, a flow detection portion 34, and a route lookup portion 36.

The bandwidth policing portion 32 carries out a process for policing, for each individual flow of packets, of whether the amount at which packets are received by the packet reception circuit 12 falls within a limit rate indicating allowable packet amounts per unit time. This process will be referred to herein as the "bandwidth policing process." In the present embodiment, "packet amount" refers to packet bit count. "Unit time" refers to a prescribed number of timer values (e.g. timer values equivalent to 10 counts) output by a timer circuit 60, discussed later.

Figure 2:
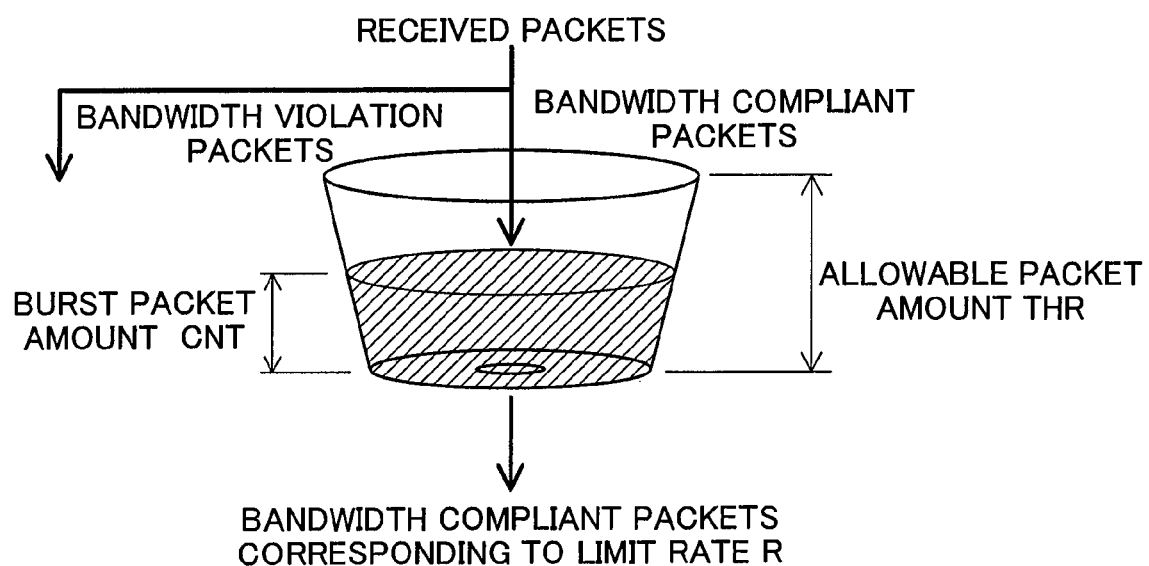
FIG. 2 is a model diagram of a conceptual depiction of a bandwidth policing process.

FIG. 2 is a model diagram depicting in conceptual terms the bandwidth policing process that is carried out by the bandwidth policing portion 32. By way of a model illustrating the monitoring process, FIG. 2 shows a bucket-shaped container of prescribed depth, open at the top and having a hole opening through the bottom. As long as water poured into the container from the top stays inside the container, water will flow out in constant quantities from the hole at the bottom. As the amount of water in the container increases, since the water will continue to flow out only in constant quantities from the hole at the bottom, there is a risk that water will overflow from the container.

That is, where the amount of water pouring into the container represents the bit count of received packets, and the amount of water flowing out through the hole at the container bottom represents the packet bit count allowed per unit time (the limit rate R), as long as the bit count of received packets stays within an allowable packet amount THR which corresponds to the depth of the container, the received packets will be allowed even as packet bit count increases or decreases. However, if there is a burst of received packets (meaning a phenomenon whereby packets are transmitted together all at one time) that exceeds the allowed packet amount THR, the received packets will determined to cause bandwidth violation. For example, in cases where the user policy is to discard packets that are determined to cause bandwidth violation, the bandwidth violation packets will be discarded without being forwarded. In the present embodiment, the discussion below will take the example of such a user policy. By carrying out the bandwidth policing process by an algorithm such as this, the bandwidth policing portion 32 is able to limit excessive traffic flow over the network. Such an algorithm is typically referred to as a leaky bucket algorithm. While FIG. 2 depicts the bandwidth policing process in conceptual terms, the specifics of the process will be discussed in detail later.

The flow detection portion 34 (see FIG. 1) detects the flow of packets from the header of the received packets. Specifically, the flow detection portion 34 derives a hash value from a prescribed combination of header information selected from header information that is recorded in the packet header, such as VLAN ID, source MAC address, destination MAC address, source IP address, destination IP address, protocol, source port number, and destination port number. Hash values derived in this way are numbers assigned to flows on an individual basis. Once the flow detection portion 34 has detected a packet flow, it will notify the bandwidth policing portion 32 of the number of the detected flow. Upon receiving this notification, the bandwidth policing portion 32 will carry out the bandwidth policing process described above on the flow in question.

The route lookup portion 36 will identify the destination IP address from the header of a packet received from the packet reception circuit 12, and on the basis of this destination IP address and a prescribed routing table will determine an output circuit to the relay destination. Once the route lookup portion 36 has determined the output circuit, it will notify the packet reception circuit 12 of the number of that the output circuit. The packet reception circuit 12 will then append to packet the output circuit number of which it has been notified, and output the packet to the packet relay circuit 16. Once the packet relay circuit 16 has input the packet from the packet reception circuit 12, it will output the packet to the packet transmission circuit 18 having the specified output circuit. In accordance with the number of the output circuit appended to the packet, the packet transmission circuit 18 will then output the packet from the specified output circuit. At this time, the packet transmission circuit 18 will strip the output circuit number from the packet.

(A2) Detailed Configuration of Bandwidth Policing Portion

Next, the configuration of the bandwidth policing portion 32 provided to the relay control portion 14 will be discussed in detail.

Figure 3:
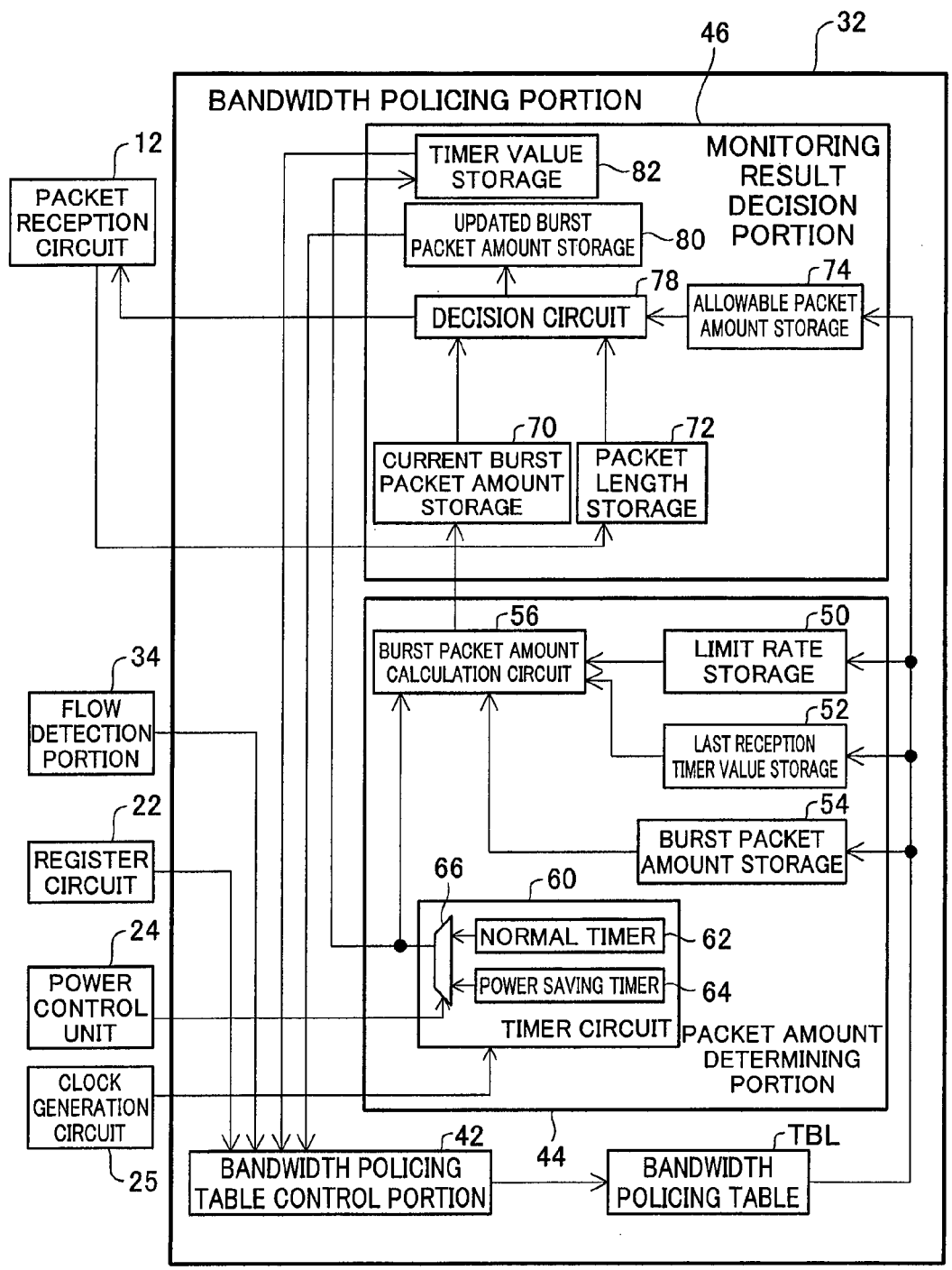
FIG. 3 is an illustration depicting in detail the configuration of a bandwidth policing portion.

FIG. 3 is an illustration depicting in detail the configuration of the bandwidth policing portion 32. As shown in FIG. 3, the bandwidth policing portion 32 includes a bandwidth policing table TBL which records data of various kinds needed for the bandwidth policing process; a bandwidth policing table control portion 42 for performing recording and reading of data to and from the bandwidth policing table TBL; a packet amount determining portion 44 adapted to determine the currently received packet amount; and a monitoring result decision portion 46 adapted to decide whether the currently received packet amount complies with the allowable packet amount THR.

FIG. 4 is a diagram depicting the arrangement of the bandwidth policing table TBL. As shown in FIG. 4, for each flow targeted for monitoring, the bandwidth policing table TBL records the parameters of "Entry number," "Limit rate R," "Last reception timer value TLST," "Burst packet amount CNT," and "Allowable packet amount THR." The entry number is a unique number assigned to each flow, and matches the number of the flow detected by the flow detection portion 34. The limit rate R corresponds to the hole in the bottom of the container depicted in FIG. 2, and indicates the bit count of packets transmittable per unit time. The last received timer value TLST indicates the value of the timer when the last packet belonging to the flow was received. The burst packet amount CNT corresponds to the amount of water remaining in the container depicted in FIG. 2 at the current point in time, and indicates the amount at which packets may be received in excess of the limit rate R without being deemed bandwidth violation at the last reception timer value TLST mentioned above. The allowable packet amount THR corresponds to the depth of the container depicted in FIG. 2, and indicates the amount at which packets are allowed to be received in excess of the limit rate R. Of this information, the limit rate R and the allowable packet amount THR will be established in the register circuit 22 by the administrator from the management terminal 20. The bandwidth policing table control portion 42 reads out data that has been established in the register circuit 22, and writes the read out data to the bandwidth policing table TBL.

The packet amount determining portion 44 shown in FIG. 3 includes a limit rate storage 50 adapted to read out and the save limit rate R from the bandwidth policing table TBL; a last reception timer value storage 52 adapted to read out and save the last reception timer value TLST from the bandwidth policing table TBL; and a burst packet amount storage 54 adapted to read out and save the burst packet amount CNT from the bandwidth policing table TBL. The packet amount determining portion 44 further includes a burst packet amount calculation circuit 56 for calculating current burst packet amount (burst packet amount NOWCNT) on the basis of limit rate R, last reception timer value TLST, and burst packet amount CNT that have been saved in the limit rate storage 50, the last reception timer value storage 52, and the burst packet amount storage 54; and a timer circuit 60 for counting a timer value TNOW for use during calculation of the burst packet amount NOWCNT by the burst packet amount calculation circuit 56. The timer value TNOW that is output by the timer circuit 30 is utilized not only at times of calculating burst packet amount NOWCNT, but also during times that the bandwidth policing table control portion 42 is writing last reception timer values TLST to the bandwidth policing table TBL. The specific method by which the burst packet amount NOWCNT is calculated by the burst packet amount calculation circuit 56 will be discussed later.

The timer circuit 60 includes a normal timer 62 for counting up the timer value in sync with the clock signal input from the clock generation circuit 25; a power saving timer 64 for counting up the timer value at a cycle equivalent to one-half that of the normal timer 62; and a selector circuit 66. On the basis of a control signal received from the power control unit 24, the selector circuit 66 will select whether the timer value output from the timer circuit 60 will use the output of the normal timer 62 or the output of the power saving timer 64.

FIG. 5 is a timing chart depicting timer value states output from the timer circuit 60 in normal mode. As illustrated, during normal mode, the timer circuit 60 will input a 400 MHz clock signal from the clock generation circuit 25. Accordingly, in the present embodiment, the normal timer 62 will count up the timer value once every four clock cycles, i.e. at a frequency of 100 MHz. The power saving timer 64 on the other hand will count up the timer value at a cycle one-half that of the normal timer 62, and therefore will count up the timer value once every two cycles, i.e. at a frequency of 200 MHz. If the control signal received from the power control unit 24 indicates normal mode, the selector circuit 66 will output the timer value of 100 MHz frequency output counted up by the normal timer 62. Consequently, during normal mode, a timer value that counts up every ten nanoseconds will be output from the timer circuit 60.

FIG. 6 is a timing chart depicting timer value states output from the timer circuit 60 in power saving mode. As illustrated, during power saving mode, the timer circuit 60 will input a 200 MHz (=400 MHz/2) clock signal from the clock generation circuit 25. Accordingly, the normal timer 62 will count up the timer value once every four clock cycles, i.e. at a frequency of 50 MHz. The power saving timer 64 on the other hand will count up the timer value at a cycle one-half that of the normal timer 62, and therefore will count up the timer value once every two cycles, i.e. at a frequency of 100 MHz. If the control signal received from the power control unit 24 indicates power saving mode, the selector circuit 66 will output the timer value of 100 MHz frequency output counted up by the power saving timer 64. Consequently, during power saving mode, as in normal mode, a timer value that counts up every ten nanoseconds will be output from the timer circuit 60.

The monitoring result decision portion 46 shown in FIG. 3 includes a current burst packet amount storage 70 adapted to input and save the burst packet amount NOWCNT calculated by the burst packet amount calculation circuit 56 mentioned above; a packet length storage 72 adapted to receive notification by the packet reception circuit 12 regarding, and to save, the packet length LEN of received packets; and an allowable packet amount storage 74 adapted to read out and save allowable packet amount THR from the bandwidth policing table TBL. The monitoring result decision portion 46 is additionally provided with a decision circuit 78 that, on the basis of current burst packet amount NOWCNT, received packet length LEN, and allowable packet amount THR that have been saved in the current burst packet amount storage 70, the packet length storage 72, and the allowable packet amount storage 74, decides whether received packet traffic complies with available bandwidth. The packet reception circuit 12 is notified of the outcome of the decision by the decision circuit 78. If the packet reception circuit 12 receives from the decision circuit 78 notification to the effect that traffic complies with available bandwidth, it will forward the received packets to the packet relay circuit 16; whereas if it receives notification of bandwidth violation, it will discard the received packets.

The monitoring result decision portion 46 is additionally provided with a updated burst packet amount storage 80 adapted to store a packet amount CNT2 that is updated according to the decision outcome by the decision circuit 78; and a timer value storage 82 adapted to save the timer value TNOW output by the timer circuit 60. The packet amount CNT2 that has been saved to the updated burst packet amount storage 80 will be read by the bandwidth policing table control portion 42 and used in a process for updating burst packet amount CNT in the bandwidth policing table TBL. The timer value TNOW that has been saved to the timer value storage 82 will be read by the bandwidth policing table control portion 42 and used in a process for updating last reception timer value TLST in the bandwidth policing table TBL.

(A3) Bandwidth Policing Process

Next, the bandwidth policing process that is executed in the packet relay device 10 of the present embodiment will be discussed in detail.

Figure 7:
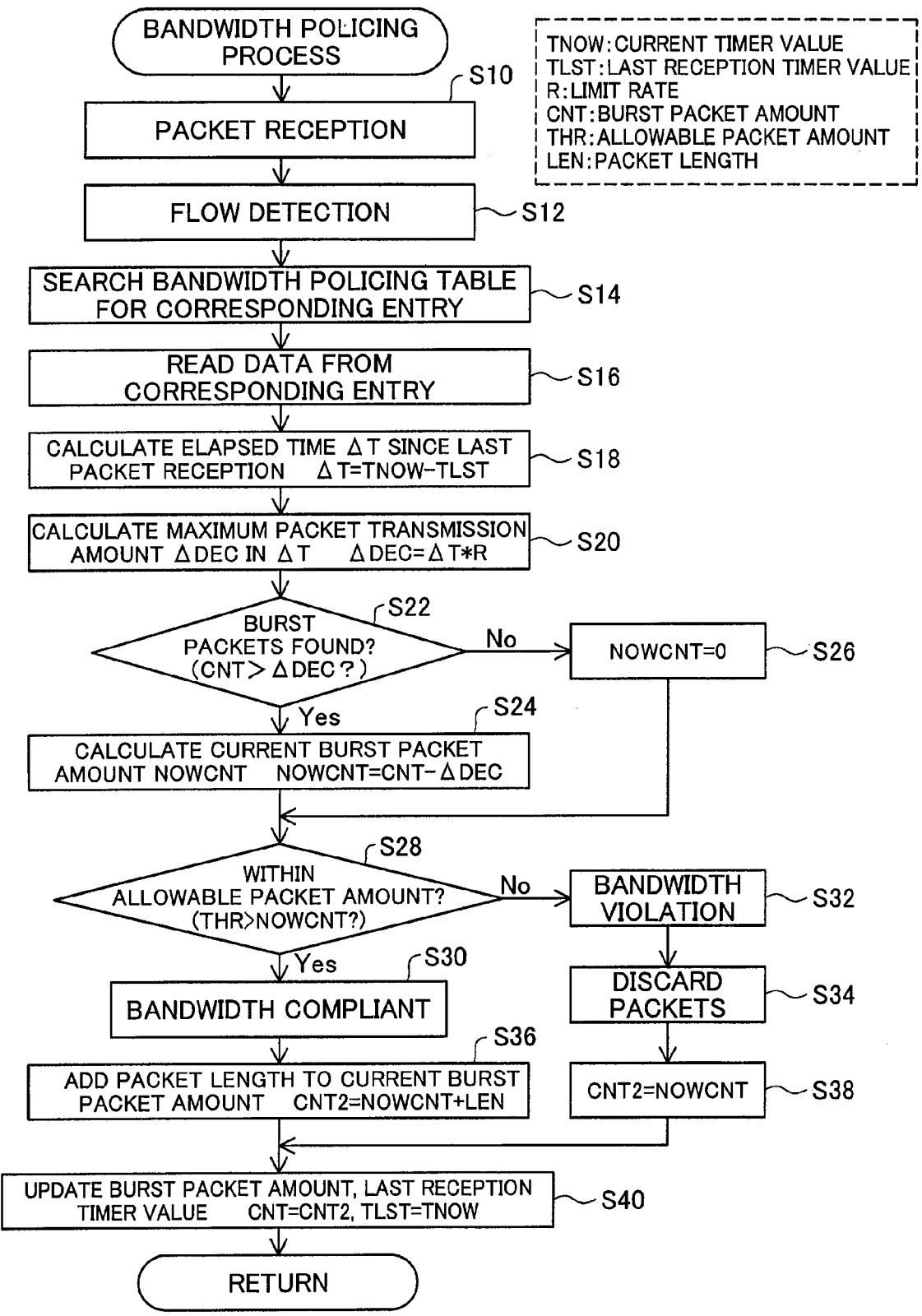
FIG. 7 is a flowchart of a bandwidth policing process.

FIG. 7 is a flowchart of the bandwidth policing process. First, when packets are received by the packet reception circuit 12 (Step S10), the flow of the received packets is detected by the flow detection portion 34 (Step S12). The flow detection portion 34 calculates the number of the detected flow on the basis of header information and a hash function, and notifies the bandwidth policing portion 32, whereupon the entry of the flow in question is retrieved from the bandwidth policing table TBL by the bandwidth policing table control portion 42 in the bandwidth policing portion 32 (Step S14). Then, from the retrieved entry, the limit rate R, the last reception time value TLST, the burst packet amount CNT, and the allowable packet amount THR are respectively read into the limit rate storage 50, the last reception timer value storage 52, the burst packet amount storage 54, and the allowable packet amount storage 74 (Step S16).

Once the various items of information mentioned above have been read from the bandwidth policing table TBL, the burst packet amount calculation circuit 56 calculates an elapsed time $\Delta T$ (timer value) from the timer value at the time that a packet belonging to the flow detected in Step S12 was previously received, to the current timer value (Step S18). Specifically, this elapsed time $\Delta T$ is calculated by deriving the difference between the last reception timer value TLST and the timer value TNOW that was output by the timer circuit 60.

Next, the burst packet amount calculation circuit 56 calculates a maximum transmission amount $\Delta DEC$ of packets that were possibly sent during the elapsed time $\Delta T$ that was calculated in Step S18 (Step S20). This maximum transmission amount $\Delta DEC$ is calculated by deriving the product of the elapsed time $\Delta T$ that was calculated in Step S18, and the limit rate R. The maximum transmission amount $\Delta DEC$ corresponds to the amount of packets leaked from the hole in the bottom of the container of FIG. 2, within the elapsed time $\Delta T$.

In the preceding Step S20, once the maximum transmission amount $\Delta DEC$ is calculated, the burst packet amount calculation circuit 56 will decide whether untransmitted packets currently remain (that is, whether any packets remain in the container of FIG. 2) (Step S22). Specifically, if the burst packet amount CNT that was read in Step S16 is greater than the maximum transmission amount $\Delta DEC$ that was calculated in Step S20, it will decide that untransmitted packets remain.

If in Step S22 it is decided that untransmitted packets remain, the burst packet amount calculation circuit 56 will calculate the current burst packet amount NOWCNT (Step S24). Specifically, the current burst packet amount NOWCNT is the value obtained by subtracting the maximum transmission amount $\Delta DEC$ calculated in Step S20 from the packet amount CNT that was read in Step S16. If on the other hand in Step S22 it is decided that no untransmitted packets remain, the burst packet amount calculation circuit 56 will set the current burst packet amount NOWCNT to "0" (Step S26). The burst packet amount NOWCNT derived in Step S24 or in Step S26 will then be read into the current burst packet amount storage 70 of the monitoring result decision portion 46.

Once the current burst packet amount NOWCNT has been read into the current burst packet amount storage 70, the decision circuit 78 will compare the current burst packet amount saved in the current burst packet amount storage 70 with the allowable packet amount THR read into the allowable packet amount storage 74 from the bandwidth policing table TBL, and decide whether the current burst packet amount NOWCNT lies within the allowable packet amount THR (Step S28). If the current burst packet amount NOWCNT is less than the allowable packet amount THR, the decision circuit 78 will make a determination of bandwidth compliance (Step S30). On the other hand, if the current burst packet amount NOWCNT is greater than the allowable packet amount THR, the decision circuit 78 will make a determination of bandwidth violation (Step S32), and will instruct the packet reception circuit 12 to discard the received packets. Upon receiving this instruction, the packet reception circuit 12 will discard the received packets (Step S34).

In the event that a determination of bandwidth compliance has been made in Step S30, the decision circuit 78 will add the packet length LEN of received packets stored in the packet length storage 72 to the current burst packet amount NOWCNT, to derive a new burst packet amount CNT2 (Step S36). On the other hand, in the event that a determination of bandwidth violation has been made in Step S32, the decision circuit 78, designating the current burst packet amount NOWCNT as the new burst packet amount CNT2 without adding the packet length LEN, will continue to use this unchanged value (Step S38). This is so that received packets will be discarded in Step S34 mentioned above. The new burst packet amount CNT2 derived by the above process will be saved to the updated burst packet amount storage 80.

Finally, the bandwidth policing table control portion 42 will record the new burst packet amount CNT2 that was saved to the updated burst packet amount storage 80 into the bandwidth policing table TBL as the updated burst packet amount CNT; and will record the current time value NOW saved in the timer value storage 82 into the bandwidth policing table TBL as the updated last reception timer value TLST (Step S40).

Figure 8:
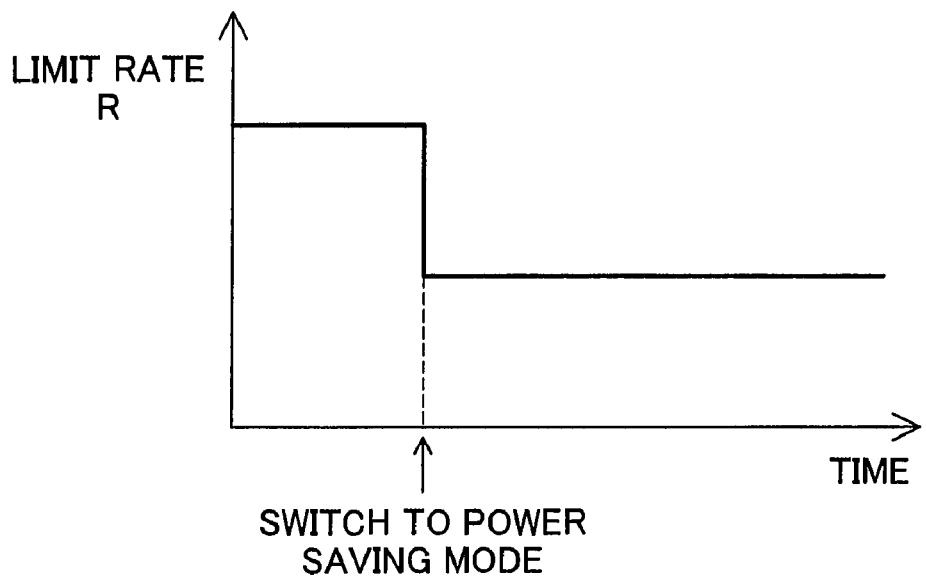
FIG. 8 is an illustration depicting a condition of reducing the limit rate by half during transition to power saving mode.

In the packet relay device 10 of the present embodiment described above, when the power mode transitions from normal mode to power saving mode by the power control unit 24, the operating clock generated by the clock generation circuit 25 will be reduced by half from 400 MHz to 200 MHz. Consequently, the timer value, which measures time on the basis of this operating clock, would normally experience a twofold extension of cycle duration, so that for example where actual time of 10 nanoseconds per timer value is needed during normal mode, actual time of 20 nanoseconds per timer value would be needed during power saving mode. If this were the case, unit time applied in the bandwidth policing process would fluctuate, and the limit rate R, i.e. transmittable packet amount per unit time, would be reduced by half as depicted in FIG. 8.

In contrast, according to the present embodiment, the timer circuit 60 is provided with a normal timer 62 and a power saving timer 64, the power saving timer 64 being designed to count up the timer value at a clock cycle one-half that of the normal timer 62. When the power mode is the normal mode, this timer circuit 60 will output the timer value that is counted up by the normal timer 62, whereas in power saving mode, it will output the timer value that is counted up by the power saving timer 64. Thus, as shown in FIGS. 5 and 6, irrespective of the power mode, the timer circuit 60 will always output a timer value that is counted up at fixed intervals. As a result, unit time will not fluctuate even during the bandwidth policing process described above, so as shown in FIG. 9, the limit rate R will be maintained at a constant level irrespective of power mode. Thus, according to the packet relay device 10 of the present embodiment, it will be possible to maintain an appropriate relayed packet amount even if the operating clock has been slowed for the purpose of power savings. In the present embodiment, circuit scale is larger owing to the two timer circuit systems provided, but since the timer circuit can be produced simply by adding from about ten to several dozen flip-flop circuits, the increase in power consumption entailed thereby is small enough to be ignored.

B. Embodiment 2

According to Embodiment 1 described above, excessive traffic flow over the network is limited by discarding received packets that cause bandwidth violation. In Embodiment 2 on the other hand, excessive traffic flow over the network is limited by queuing packets for transmission to a prescribed buffer, and delaying the transmission timing of packets that exceed the available bandwidth. Typically, limiting bandwidth by the method of Embodiment 1 described above is termed "policing," whereas limiting bandwidth by the method of Embodiment 2 described below is termed "shaping."

(B1) General Configuration of Packet Relay Device of Embodiment 2

Figure 10:
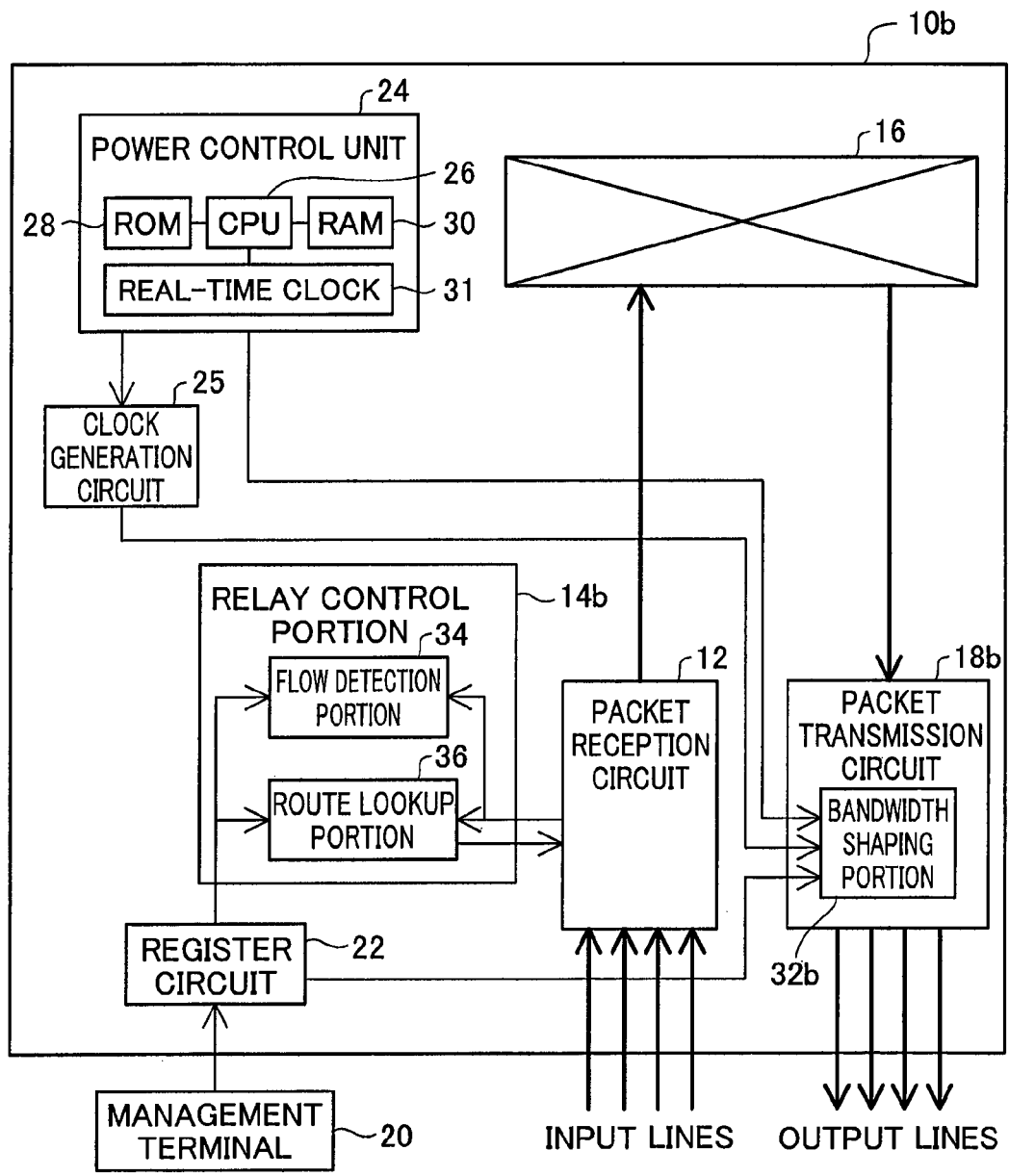
FIG. 10 is an illustration depicting the general configuration of a packet relay device according to Embodiment 2.

FIG. 10 depicts the general configuration of a packet relay device 10b according to Embodiment 2. As will be apparent from a comparison of FIG. 1 and FIG. 10, Embodiment 1 and Embodiment 2 differ in that the bandwidth policing portion 32 (in Embodiment 2, bandwidth shaping portion 32b) of Embodiment 1 is provided with a relay control portion 14, whereas that of Embodiment 2 is provided with a packet transmission circuit 18b. Like components in Embodiment 1 and Embodiment 2 have been assigned like symbols.

(B2) Detailed Configuration of Packet Transmission Circuit

Figure 11:
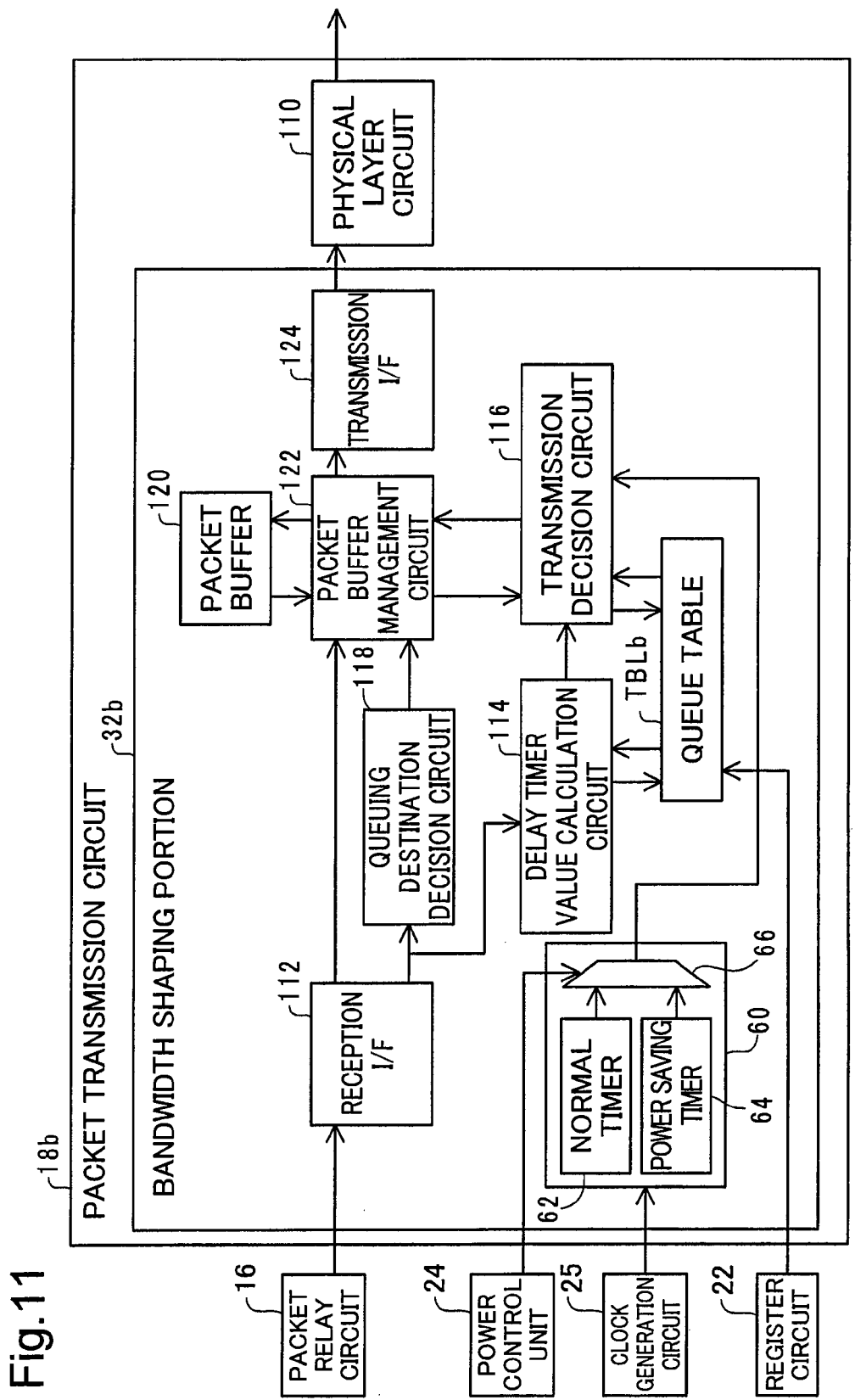
FIG. 11 is an illustration depicting in detail the configuration of a packet transmission circuit of Embodiment 2.

FIG. 11 is an illustration depicting in detail the configuration of the packet transmission circuit 18b of Embodiment 2. As shown, the packet transmission circuit 18b of the present embodiment includes the bandwidth shaping portion 32b and a physical layer circuit 110. The physical layer circuit 110 is a circuit adapted to output packets received from the bandwidth shaping portion 32b to an output circuit in the form of an electrical signal.

The bandwidth shaping portion 32b of the present embodiment includes a reception interface 112 for receiving packets output by the packet relay circuit 16; a timer circuit 60 similar in configuration to that of Embodiment 1; a delay timer value calculation circuit 114 adapted to calculate a delay time (timer value) for packet transmission; a queuing destination decision circuit 118 adapted to decide on a queuing destination for packets received by the reception interface 112; a packet buffer 120 adapted to queue packets for individual queuing destinations; a packet buffer management circuit 122 for managing input and output of packets to and from the packet buffer 120; a transmission decision circuit 116 adapted to decide upon a queue for transmitting a packet, based on various information recorded in a queue table TBLb and on the current timer value output from the timer circuit 60; and a transmission interface 124 for transmitting to the outside via the physical layer circuit 110 the packets that have been output by the packet buffer 120.

The queuing destination decision circuit 118 decides on queuing destinations for packets based on header information of packets received by the packet reception circuit 12. In the present embodiment, queues for individual flows have been set up in the packet buffer 120, and on the basis of header information of received packets, the queuing destination decision circuit 118 will detect the flow of the packet and decide on a queuing destination. While the present embodiment has queues for individual flows of packets in this way, queues could instead be set up based on individual VLAN ID, destination IP address, or destination MAC address recorded in packet header information, or for individual output circuits.

For each queuing destination decided on by the queuing destination decision circuit 118, the packet buffer management circuit 122 will write packets to the end of the corresponding queue in the packet buffer 120. If the transmission decision circuit 116 decides to forward a packet, the packet buffer management circuit 122 will read out from the packet buffer 120 the packet awaiting transmission at the head of the queue targeted for transmission, and output the packet via the transmission interface 124.

The delay timer value calculation circuit 114 calculates a delay timer (delay timer value DT) for packet transmission on the basis of the limit rate Rb established in the queue table TBLb and on the packet length LEN of received packets. The specific method for calculating the delay timer value DT will be discussed later.

Figures 12, 13:
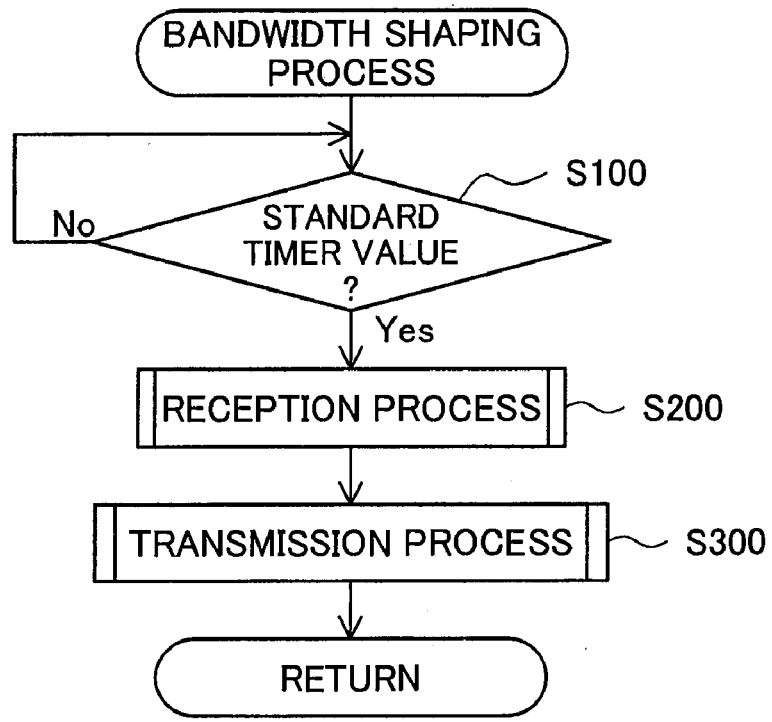
FIG. 12 is a diagram showing the arrangement of a queue table.
FIG. 13 is a flowchart of the bandwidth shaping process of Embodiment 2.

FIG. 12 is a diagram showing the arrangement of the queue table TBLb. As shown, the queue table TBLb records queue numbers, limit rate Rb, last transmission timer value TLSTb, and delay timer value DT, individually assigned to each queue. The limit rate Rb indicates the bit count of packets transmittable per unit time from the queue. This limit rate Rb will be set for each queue from the management terminal 20, via the register circuit 22. The last transmission timer value TLSTb indicates the value of the timer when the last packet was transmitted from the queue. The delay timer value DT indicates a delay time (timer value) for packet transmission from the queue.

The transmission decision circuit 116 compares the last transmission timer value TLSTb and the delay timer value DT recorded in the queue table TBLb, to the current timer value TNOW that was output by the timer circuit 60, in order to decide on a queue for transmitting packets from the packet buffer 120. The specific method of deciding on a queue for packet transmission will be discussed later.

(B3) Bandwidth Shaping Process

Next, the bandwidth shaping process that is executed in the packet relay device 10b of Embodiment 2 will be discussed in detail.

FIG. 13 is a flowchart of the bandwidth shaping process of Embodiment 2. As shown, first, on the basis of the timer value output by the timer circuit 60, the bandwidth shaping portion 32b will decide whether the current timer value has reached a standard timer value (Step S100). The standard timer value refers to unit time for the bandwidth shaping 32b executes this bandwidth shaping process. The standard timer value can be calculated using Expression (1) below, based on a standard byte count of packets transmitted by the packet relay device 10b, and maximum bandwidth over which the bandwidth shaping portion is able to transmit packets.

$$\text{standard timer value [s]} = \text{standard byte count} * 8 \text{ [bit]}/\text{maximum bandwidth [bps]} \quad (1)$$

(In the present embodiment, [s] denotes timer value, not seconds.)

In Step S100, if it is decided that the current timer value has reached the standard timer value, a reception process (Step S200) and a transmission process (Step S300) will be carried out. If it is decided that the current timer value has not reached the standard timer value, the process of Step S100 loops. That is, in the present embodiment, the reception process of Step S200 and the transmission process of Step S300 are executed repeatedly, at each standard timer value mentioned above.

Figure 14:
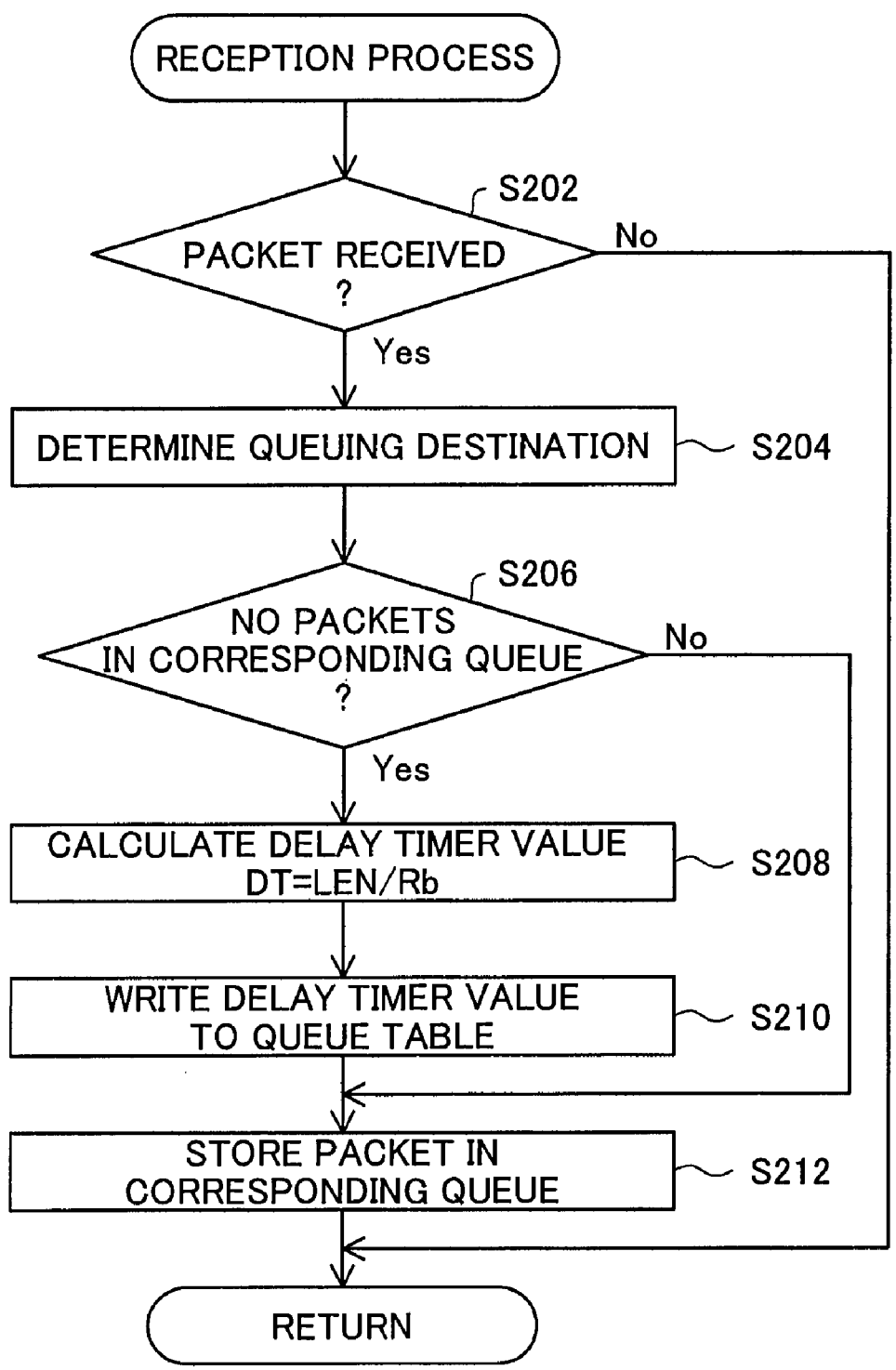
FIG. 14 is a detailed flowchart of the reception process.

FIG. 14 is a detailed flowchart of the reception process. When execution of this reception process is initiated, it will first be decided whether a packet has been received by the reception interface 112 (Step S202); if the reception interface 112 has received a packet, a queuing destination for the packet will be decided by the queuing destination decision circuit 118 (Step S204). If the reception interface 112 has not received a packet, the system will move on to the transmission process, described later.

Once a queuing destination has been decided in Step S204, the packet buffer management circuit 122 will refer to the packet buffer 120 and decide whether packets are stored in the queue associated with the queuing destination (Step S206). If no packets are stored in the associated queue, the delay timer value calculation circuit 114 will calculate a delay time (delay timer value DT) for packet transmission from that queue (Step S208). In the present embodiment, the delay timer value DT is calculated by dividing the packet length LEN of the packet received by the reception interface 112, by the limit rate Rb of the queue in question. This delay timer value DT can be represented by Expression (2) below. According to Expression (2), the delay timer value DT indicates the earliest time at which the packet can be transmitted at the next opportunity.

$$DT = LEN/Rb \qquad (2)$$

Once the delay timer value DT has been calculated in Step S208, the delay timer value calculation circuit 114 will record this value in the entry for the queue in question in the queue table TBLb (Step S210). The packet buffer management circuit 122 will then store the received packet at the end of the queue in question in the packet buffer 120 (Step S212). In Step S206, if it has been decided that packets are stored in the queue in question, the received packet will be stored as-is at the end of the queue in question, without calculating a delay timer value DT. The reason is that if packets are already stored, this means that a delay timer value DT has already been calculated in the previous bandwidth shaping process, and this delay timer value DT has been recorded in the queue table TBLb. Once the reception process described above has been completed, next, the transmission process will be carried out.

Figure 15:
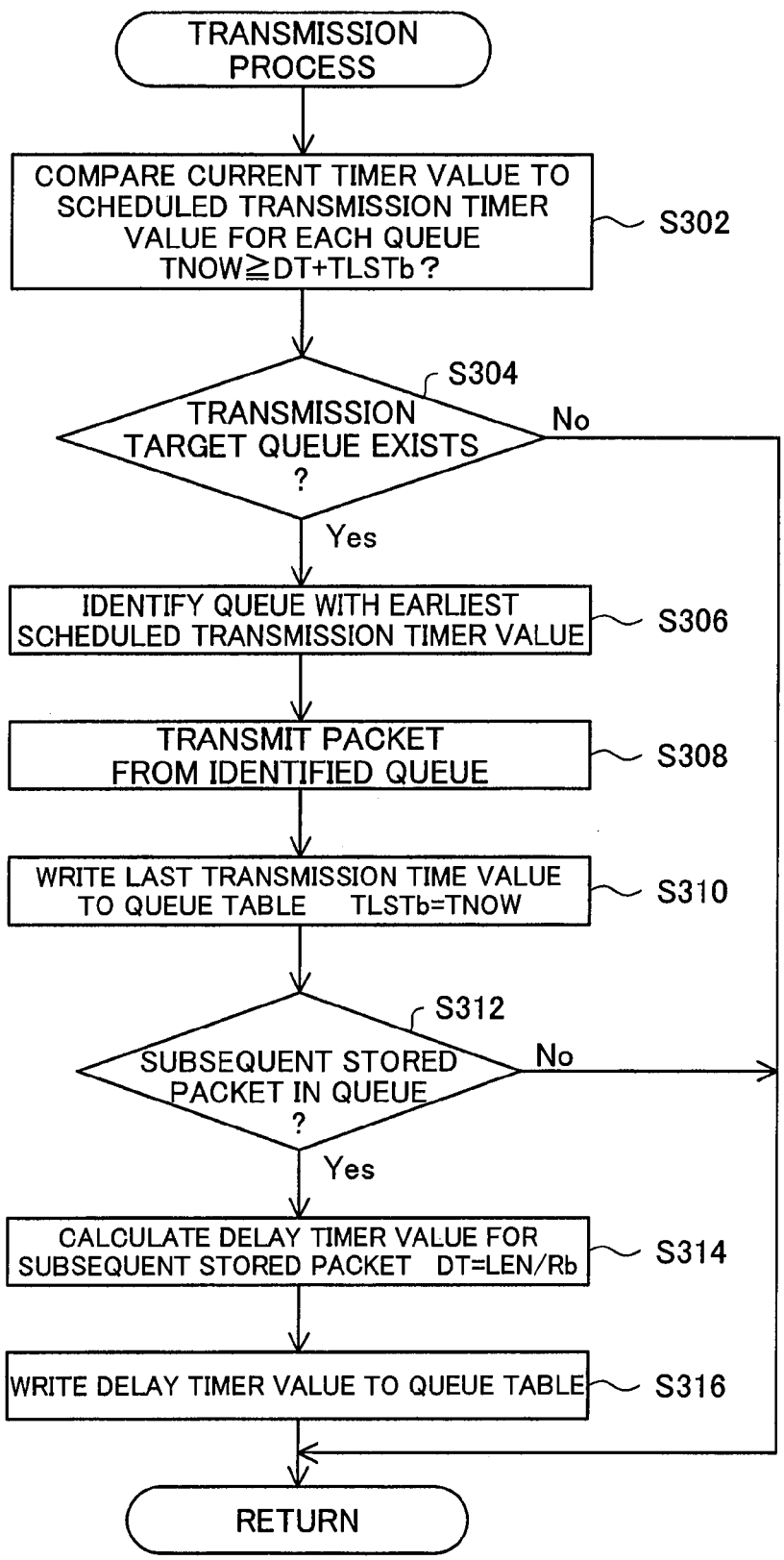
FIG. 15 is a detailed flowchart of the transmission process.

FIG. 15 is a detailed flowchart of the transmission process. Once execution of this transmission process is initiated, first, the transmission decision circuit 116 compares the current timer value TNOW output by the timer circuit 60, to the scheduled transmission timer value for each queue (Step S302). Scheduled transmission timer values are represented as the sum of last transmission timer value TLSTb and the delay timer value DT for each queue, which have been recorded in the queue table TBLb.

If a queue that meets the condition that the current timer value TNOW and a scheduled transmission timer value match, or that the current timer value exceeds the scheduled transmission timer value, is found, the queue in question will be selected as a candidate for packet transmission (hereinafter termed a "transmission candidate queue"). The transmission decision circuit 116 will then decide on the basis of the conditions mentioned above whether any transmission target queues exist (Step S304). In the event of a decision that no transmission candidate queues exist, the transmission process will terminate.

In the event of a decision that transmission candidate queues exist, then from among these transmission candidate queues in question the transmission decision circuit 116 will identify the queue having the earliest scheduled transmission timer value (Step S306). Once the queue having the earliest scheduled transmission timer value has been identified, packet transmission from the queue in question will be carried out by the packet management circuit 122 (Step S308). Once packet transmission has been carried out, the last transmission time value TLSTb for the queue in question in the queue table TBLb will be updated to the current timer value TNOW by the transmission decision circuit 116 (Step S310).

Once the last transmission time value TLSTb has been updated in Step S310, next, the packet management circuit 122 will decide whether there is a subsequent stored packet in the queue that was identified in Step S306 (Step S312). If there is no subsequent stored packet, the transmission process will terminate. On the other hand, if there is a subsequent stored packet, a new delay timer value DT will be calculated for the queue in question by the delay timer value calculation circuit 114 (Step S314). As in Step S208 of the reception process described earlier, this delay timer value DT is a value derived by dividing the packet length LEN of the stored packet by the limit rate Rb for the queue. Once this new delay timer value DT has been calculated, the delay timer value calculation circuit 114 will write this value into the entry for the queue in question in the queue table TBLb (Step S316). Through the series of processes described above, the bandwidth shaping process of Embodiment 2 comes to completion.

In the packet relay device 10b of Embodiment 2 described above, delay times (delay timer values DT) for transmission of packets queued in the packet buffer 120 are adjusted according to packet length LEN of the packets and to the limit rate Rb of each queue, as indicated by Expression (2) above. According to Expression (2), greater packet length LEN relative to the limit rate Rb will result in a larger delay timer value DT. That is, in the present embodiment, bandwidth limitation is carried out by delaying transmission of packets that exceed the bandwidth.

Figure 9:
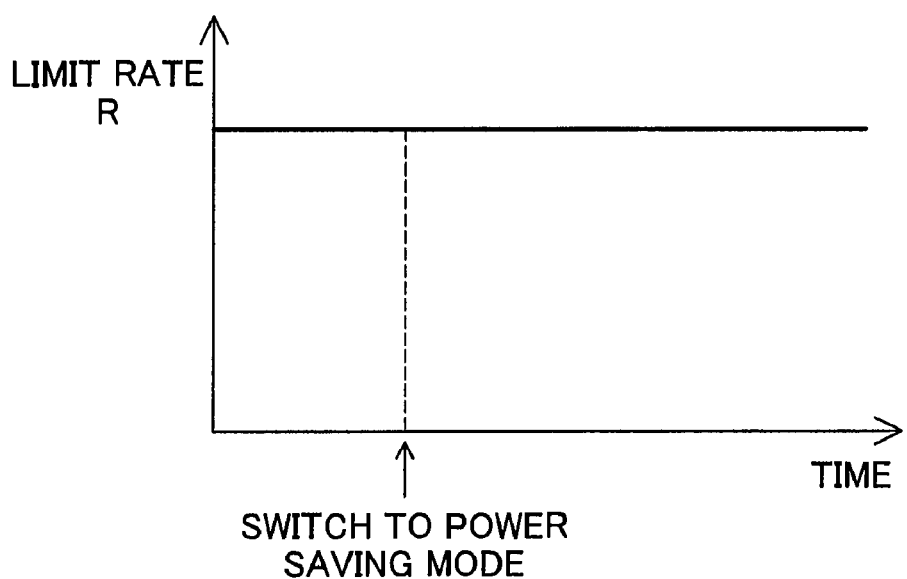
FIG. 9 is an illustration depicting a condition of holding the limit rate constant regardless of power mode.

The timer circuit 60 of the bandwidth shaping portion 32b in the present embodiment is comparable in design to that in Embodiment 1. Thus, irrespective of the power mode, the timer value output by the timer circuit 60 will always be counted up at fixed intervals. Consequently, the value of the limit rate Rb, which is a determinant in calculating the delay timer value DT, will not fluctuate depending on the power mode. As a result, as depicted in FIG. 9, according to the present embodiment it is possible to carry out packet transmission at a constant limit rate, just as in Embodiment 1.

C. Modified Embodiments

While the present invention has been shown above through certain preferred examples, other arrangements are possible without departing from the scope of the invention. For example, some of the functions implemented through hardware could instead be implemented through software, and the reverse is possible as well. Additional possible modifications are described below.

(C1) Modified Embodiment 1

In Embodiment 1 described above, if the power mode transitions to power saving mode, the bandwidth policing process will be carried out on all flows on the basis of the timer value output by the power saving timer 64. However, it would be possible to instead select the timer value to be used in the bandwidth policing process, on an individual flow basis.

Specifically, as depicted in FIG. 16, a category recording a flag for timer selection (hereinafter termed a "Timer Select flag") is appended to each entry in the bandwidth policing table TBL. If this Timer Select flag is "0," when transitioning to power saving mode, the bandwidth policing process for the flow in question will be carried out on the basis of the timer value that is output by the power saving timer. On the other hand, if this Timer Select flag is "1," when transitioning to power saving mode, the bandwidth policing process for the flow in question will be carried out on the basis of the timer value that is output by the normal timer. That is, as depicted in FIG. 9, for flows for which the Timer Select flag has been set to "0," the limit rate will not change when the power mode transitions to power saving mode, whereas as depicted in FIG. 8, for flows for which the Timer Select flag has been set to "1," the limit rate will fall to half that of normal when the power mode transitions to power saving mode.

Where the timer that is used is selectable for individual packet flows in this way, it will be possible for example to set the Timer Select flag to "0" in order to always monitor bandwidth of a given flow at 200 Mbps, and for other flows, to set the Timer Select flag to "1" in order to monitor bandwidth at 200 Mbps during normal mode, while monitoring bandwidth at 100 Mbps during power saving mode. That is, according to the present embodiment, user distinctions can be made between a priority user wishing to assure constant bandwidth even during power saving mode, and a non-priority user wishing to be provided with bandwidth at lower cost but with smaller bandwidth during power saving mode, thereby making it possible to provide users with different assured levels of bandwidth service. It is also possible for the timer flag settings for the flows to be made by the management terminal 20 via the register circuit 20.

The approach of switching the timer used for individual flows could be implemented as-is in Embodiment 2 as well. Specifically, as depicted in FIG. 17, a category recording a Timer Select flag would be added to the queue table TBLb. By so doing it becomes possible to select, on an individual queue basis, whether to always maintain constant bandwidth, or to reduce bandwidth by half when transitioning to power saving mode.

(C2) Modified Embodiment 2

Figure 18:
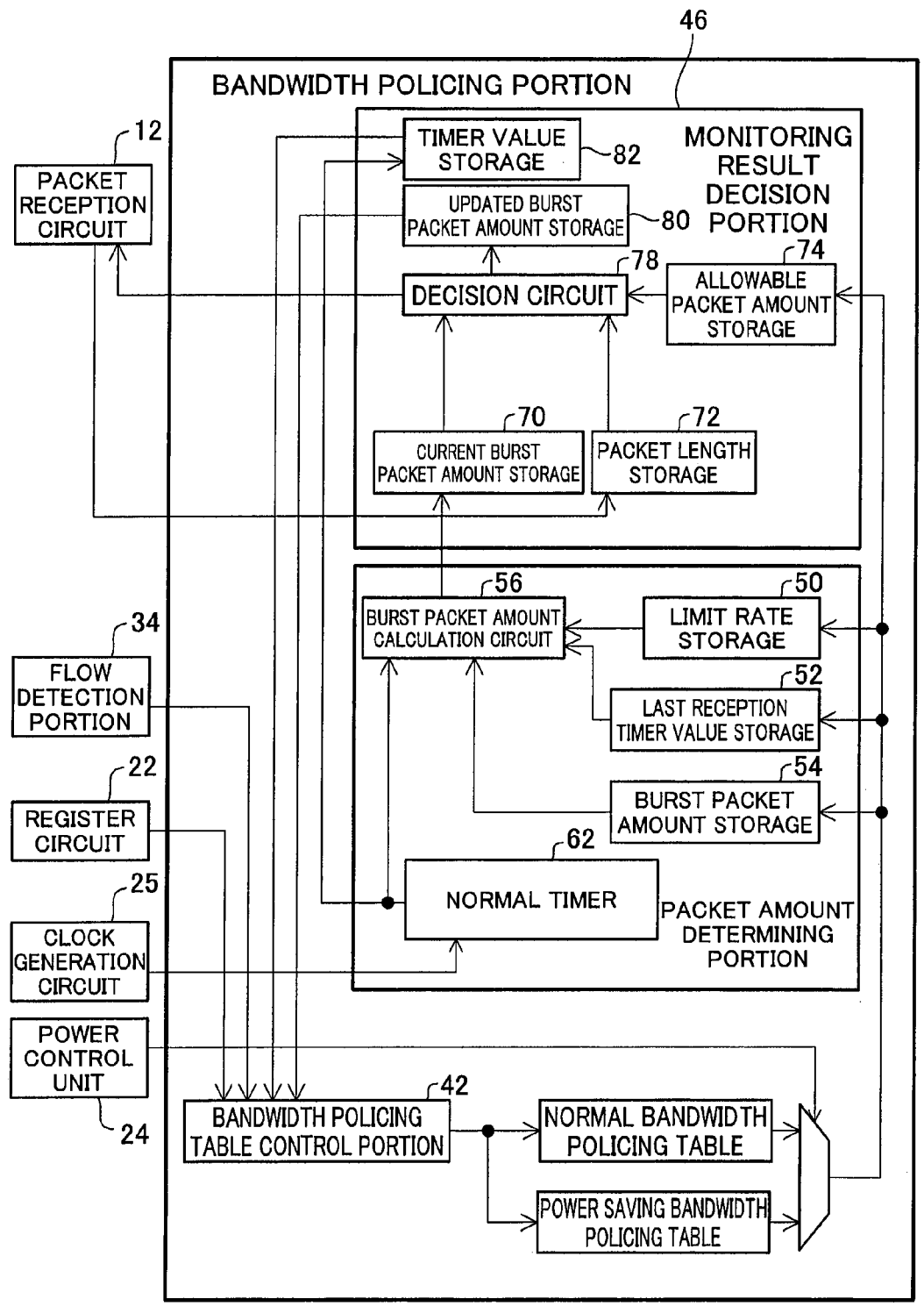
FIG. 18 is an illustration depicting the configuration of a bandwidth policing portion furnished with two different bandwidth policing tables.

In Embodiment 1 and Embodiment 2 described above, two timer circuit systems are provided in order to avoid fluctuations in bandwidth when transitioning to power saving mode. However, it would be acceptable to instead provide the timer with the normal timer 62 only, and to prepare two types of bandwidth policing table, namely, a normal bandwidth policing table that records a normal limit rate R, and a power saving bandwidth policing table that records a power saving limit rate R that is double the normal one. By preparing two tables in this way and selecting the table to be used according to the power mode, it will be possible to maintain constant bandwidth comparably to Embodiment 1 and Embodiment 2 described previously. FIG. 18 depicts an exemplary configuration of a bandwidth policing portion furnished with both a normal bandwidth policing table and a power saving bandwidth policing table.

(C3) Modified Embodiment 3

In Embodiment 1 described above, in Step S18 (see FIG. 7) of the bandwidth policing process taking place immediately after the power mode has been switched from normal mode to power saving mode, there may be carried out a process to double the value of the last reception timer value TLST. By so doing, timer values before and after mode switching can be adjusted on the same time axis, making it possible to correctly calculate elapsed time $\Delta T$ since the previous packet reception. As a result, it will be possible to prevent fluctuations in bandwidth from occurring at the instant of mode switching. For similar reasons, in Embodiment 2 it would be acceptable in Step S302 (see FIG. 15) of the bandwidth policing process taking place immediately after the power mode has been switched from normal mode to power saving mode to carry out a process to double the last reception timer value TLSTb and the delay timer value TD at that time only.

(C4) Modified Embodiment 4

In the preceding Embodiment 1 and Embodiment 2, during power saving mode, the frequency of the clock signal generated by the clock generation circuit 25 will be reduced to half that in normal mode. However, the frequency of the operating clock during power saving mode is not limited to this. For example, it would be possible instead to employ a frequency that is one-third or one-fourth that during normal mode. In such cases, the power saving timer 64 would count up the timer value at a cycle that is one-third or one-fourth that of the normal timer 62. That is, if the frequency of the clock signal generated by the clock generation circuit 25 has been reduced to 1/N, provided that the power saving timer 64 counts up the timer value over a number of clock cycles equivalent to 1/N the number of clock cycles over which the normal timer 62 counts up the timer value, a constant limit rate can be maintained in the same manner as in the previous embodiments. N is a real number greater than 1. Where the frequency of the clock signal has changed to 1/N, provided that the power saving timer 64 counts up the timer value over a number of clock cycles equivalent to 184 (where M is a real number greater than N) the number of clock cycles over which the normal timer 62 counts up the timer value, the limit rate during power saving mode can made lower than the limit rate during normal mode.

What is claimed is:

1. A packet relay device for relaying packets flowing through a network, comprising:
    a receiving portion that receives packets from the network;
    a clock generation portion that generates a clock signal of a prescribed frequency as a standard for operation of the packet relay device;
    a timer portion that counts up a timer value over a first number of clock cycles based on the clock signal;
    a relay control portion that receives the timer value from the timer portion, and relays the received packets to a destination specified by header information of the packets while limiting the amount of packets forwardable per a predetermined increment of the timer value to a prescribed amount of packets;
    a power control portion that controls the clock generation portion to reduce the frequency of the clock signal to 1/N, so as to reduce power consumption by the packet relay device, where N is a real number greater than 1;
    wherein:
    when switching a power mode from a normal mode to a power saving mode based on amount of packets received by the receiving portion, the power control portion generates an instruction for both the timer portion and the clock generation portion;
    the clock generation portion reduces the frequency of the clock signal to 1/N in response to the instruction from the power control portion; and
    the timer portion includes:
        a normal timer portion that counts up a first timer value over the first number of clock cycles;
        a power saving timer portion that counts up a second timer value over the second number of clock cycles equivalent to 1/N of the first number of clock cycles; and
        a selector circuit that selects, according to the instruction from the power control portion, either the first timer value counted up by the normal timer portion or the second timer value counted up by the power saving timer portion, as the timer value that is output to the relay control portion.

2. The packet relay device according to claim 1, wherein the relay control portion determines that the received packets cause bandwidth violation, when the amount of the received packets per the predetermined increment of the timer value that is counted up by either the normal timer portion or the power saving timer portion which is selected by the selector circuit.

3. The packet relay device according to claim 2, wherein the relay control portion detects flows of the received packets based on the header information, and performs the limiting the amount of the packets separately for each of the flows.

4. The packet relay device according to claim 3, wherein the timer portion is capable of outputting both a first timer value that is counted up over the first number of clock cycles and a second timer value that is counted up over the second number of clock cycles, even if the frequency of the clock signal has been reduced to 1/N by the power control portion; and separately for each of the flows, the relay control portion selects, based on a prescribed setting, whether to use the first timer value or the second timer value.

5. The packet relay device according to claim 1, wherein the relay control portion performs the limiting the amount of the packets by delaying transmission timings of the received packets, depending on packet length of the received packets and the amount of packets forwardable per the predetermined increment of the timer value that is counted up by either the normal timer portion or the power saving timer portion which is selected by the selector circuit.

6. The packet relay device according to claim 5, wherein the relay control portion queues the received packets separately for the each destination, and performs the limiting the amount of the packets separately for the each destination.

7. The packet relay device according to claim 6, wherein the timer portion is capable of outputting both a first timer value that is counted up over the first number of clock cycles and a second timer value that is counted up over the second number of clock cycles, even if the frequency of the clock signal has been reduced to 1/N by the power control portion; and separately for the each destination, the relay control portion selects, based on a prescribed setting, whether to use the first timer value or the second timer value.

* * * * *